United States Patent
Kim et al.

(10) Patent No.: US 10,752,319 B2
(45) Date of Patent: Aug. 25, 2020

(54) DRIVING CONTROL METHOD OF IN-WHEEL DRIVE FOR ELECTRIC BICYCLE

(71) Applicant: H&E CO., LTD, Gumi-si (KR)

(72) Inventors: Gyu Chang Kim, Gumi-si (KR); Do Hwan Lee, Gumi-si (KR); Jun Cheol Choi, Gumi-si (KR); Jeong Sam Kim, Gumi-si (KR)

(73) Assignee: H&E CO., LTD., Gumi-si (KR)

( * ) Notice: Subject to any disclaimer, the term of this patent is extended or adjusted under 35 U.S.C. 154(b) by 68 days.

(21) Appl. No.: 16/093,119

(22) PCT Filed: Aug. 2, 2017

(86) PCT No.: PCT/KR2017/008321
§ 371 (c)(1),
(2) Date: Mar. 5, 2019

(87) PCT Pub. No.: WO2018/026180
PCT Pub. Date: Feb. 8, 2018

(65) Prior Publication Data
US 2019/0193811 A1 Jun. 27, 2019

(30) Foreign Application Priority Data
Aug. 3, 2016 (KR) .................. 10-2016-0098722

(51) Int. Cl.
*B62M 6/50* (2010.01)
*B62M 6/60* (2010.01)
(Continued)

(52) U.S. Cl.
CPC ............. *B62M 6/50* (2013.01); *B62M 6/45* (2013.01); *B62M 6/60* (2013.01); *B62M 6/90* (2013.01);
(Continued)

(58) Field of Classification Search
CPC . B62M 6/50; B62M 6/45; B62M 6/60; B62M 6/90
See application file for complete search history.

(56) References Cited

U.S. PATENT DOCUMENTS 10,501,146 B2 * 12/2019 Vijaya Kumar ......... B62M 6/45
10,513,309 B2 * 12/2019 Gong ..................... B62M 11/14

FOREIGN PATENT DOCUMENTS

JP 4235446 B2 3/2009
JP 5523626 B2 6/2014
(Continued)

OTHER PUBLICATIONS

International Search Report for international application No. PCT/KR2017/008321.
PCT Written Opinion for PCT/KR2017/008321.

*Primary Examiner* — Kevin Hurley

(57) ABSTRACT

A driving control method for an electric bicycle includes: a starting step of supplying the electric power to the electric motor (41) of the electric driving unit (40) and the driving control unit (80) and making the electric bicycle ready to move using the electric power upon a start signal; a constant speed driving step of moving the electric bicycle at a constant rotational speed under the control of the electric driving unit (40), regardless of the pedaling power is provided; a constant speed driving releasing step of automatically discontinuing the constant speed driving step; and a slope skidding prevention step of preventing the electric bicycle from being pushed, in a moving direction or in an opposite direction to the moving direction when the electric bicycle starts and stops on a slope by applying a high load and a counter electromotive force to the electric driving unit (40) and the electric motor (41).

10 Claims, 12 Drawing Sheets

(51) Int. Cl.
*B62M 6/90* (2010.01)
*B62M 6/45* (2010.01)
(52) U.S. Cl.
CPC ....... B60L 2220/44 (2013.01); *B62K 2204/00* (2013.01)

(56) References Cited

FOREIGN PATENT DOCUMENTS

| | | | |
|---|---|---|---|
| KR | 10-2014-0038049 | A | 3/2014 |
| KR | 10-1429443 | B1 | 8/2014 |
| KR | 10-1527487 | B1 | 6/2015 |
| KR | 10-1530171 | B | 6/2015 |

* cited by examiner

<Starting step>

<Starting step using a key console>  <Starting step by pedaling manipulation>

DRIVING CONTROL METHOD OF IN-WHEEL DRIVE FOR ELECTRIC BICYCLE

CROSS REFERENCE

This application is a national stage application of PCT/KR2017/008321 filed on Aug. 2, 2017, which claims priority of Korean patent application number 10-2016-0098722 filed on Aug. 3, 2016. The disclosure thereof is incorporated herein by reference in its entirety.

TECHNICAL FIELD

The present invention relates to a in-wheel driving control method for an electric bicycle. According to the present invention, an electric bicycle is capable of an automatic driving at a constant speed using an in-wheel drive. Rider's fatigue due to pedaling can be minimized. Control operations are simple and effective which are required in various driving situations. Furthermore, convenient functions such as user recognition can be improved.

BACKGROUND OF THE INVENTION

Generally, a bicycle is energy-free and environment-friendly. Unlike other transportation means, bicycles are convenient for a short-distance travel because they are driven by rider's pedaling. However, they require more physical strength than walking or running when travelling an uphill. In that case, bicycling may be harmful to user's health.

In recent years, electric bicycles, hybrid bicycles, and the like are being developed. They are equipped with electric batteries (70) and electric motors (41) so that a rider can more easily travel an uphill which requires hard pedaling.

An electric bicycle can travel has a basic function of a typical bicycle, i.e., traveling by rider's pedaling power. In addition thereto, it also can travel without pedaling using an easy and automatic driving function. An electric battery (70) and an electric motor (41) are installed in the electric bicycle for the automatic driving.

A passive-driving bicycle (passive driving by foot motion and pedal) can be used for a short distance travel, a workout for health, or a hobby for well-being life.

An automatic-driving bicycle, which is operated by rotation of the electric motor (41) using the electric battery (70), is more proper for a person, such as elderly people, who is in need of care for a long distance travel. The automatic-driving bicycle requires less physical power consumption and thus proper for a tough driving on a slope or for a lone distance travel.

In recent years, the electric bicycles have been in an increasing demand due to its convenient automatic drive and due to growth of an aging population either at national level or at international level. Still, more research and efforts are underway to develop superior technology, performance, and convenience.

A conventional electric bicycle adopts a pedal assist system (PAS) or a throttle system. In the pedal assist system (PAS), an electric power is automatically provided by the electric motor (41) to assist a pedaling power based on a pedaling and a load. In the throttle system, a rider activates a throttle to have the electric motor (41) operated in the similar manner as in a scooter or a motorcycle.

The throttle method is advantageous in that it is possible to automatically travel at a constant speed. However, it is considerably inconvenient that a user has to manually control operations during driving. See Korean Patent Registration Nos. 10-1530171 and 10-1527487.

The pedal assist system is convenient for manipulation and operation in that an electric power is automatically provided by the electric motor (41) to assist a pedaling power based on a pedaling and a load. However, its critical disadvantage is a constant speed automatic driving is not available. In addition, a control range is also very limited. In this aspect, there are limitations in improving functionality and convenience of an electric bicycle.

DETAILED DESCRIPTION OF THE INVENTION

Problems to be Solved

An objective of the present invention is to provide a in-wheel driving control method for an electric bicycle, which employs a pedal assist system (PAS). The method enables the electric bicycle to travel at a constant speed. Driving operations necessary on travel such as a constant speed automatic driving step, a slope skidding prevention step, etc. are controlled by a new method, e.g., a combination of forward and reverse pedaling. Thereby the present invention improves the performance of the electric bicycle and makes the operation of the electric bicycle more convenient and safe.

Solution to Solve the Problems

According to an embodiment, a driving control method for an electric bicycle, which is equipped with an in-wheel drive driving control driver (A) and a pedal assist system (PAS), includes: a starting step of supplying an electric power to an electric motor (41) of an electric driving unit (40) and an driving control unit (80) and making the electric bicycle ready to drive using the electric power upon a start signal; a constant speed driving step of traveling at a constant rotational speed under the control of the electric driving unit (40), regardless of a pedaling force; a constant speed driving releasing step of releasing the constant speed driving step when necessary; and a slope skidding prevention step of preventing the electric bicycle from being pushed in a moving direction or in an opposite direction to the moving direction when the electric bicycle starts and stops on a slope by applying a high load and a counter electromotive force to the electric driving unit (40) and the electric motor (41).

Advantages of the Invention

In the above-described driving control method of in-wheel drive for an electric bicycle according to an embodiment of the present invention, the starting step may be initiated by using a key console or a pedaling. When a user having the key console approaches the electric bicycle, the electric bicycle is automatically put into a standby to start. Alternatively, the electric bicycle can enter into the starting step by a pedaling manipulation. According to the present invention, the electric bicycle can travel at a constant speed even though it employs the pedal assist system (PAS). In addition, the improved control method using a combined forward and reverse pedaling can enable the constant speed driving, the slope skidding prevention, and the constant speed driving release, thus contributing to enhance convenience and performance.

BEST MODE

Figure 1:
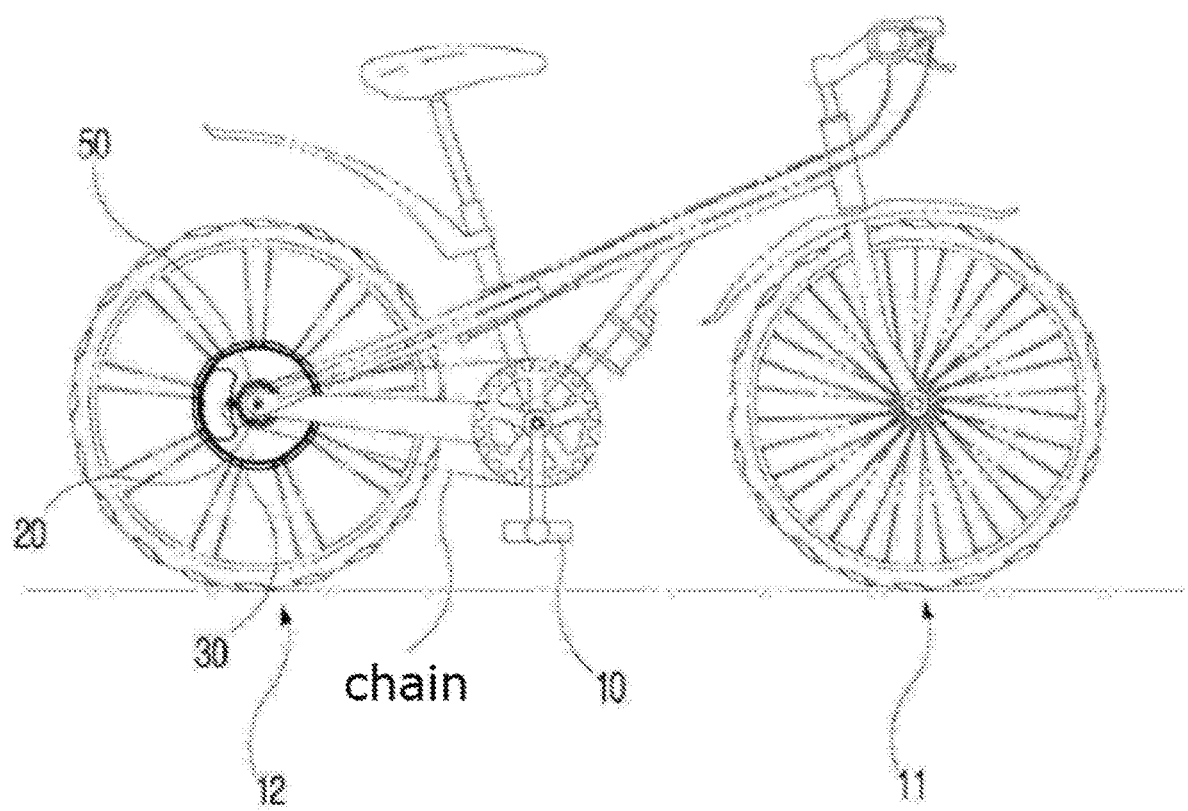
FIG. 1 shows a bicycle according to an embodiment of the present invention.
Figure 2:
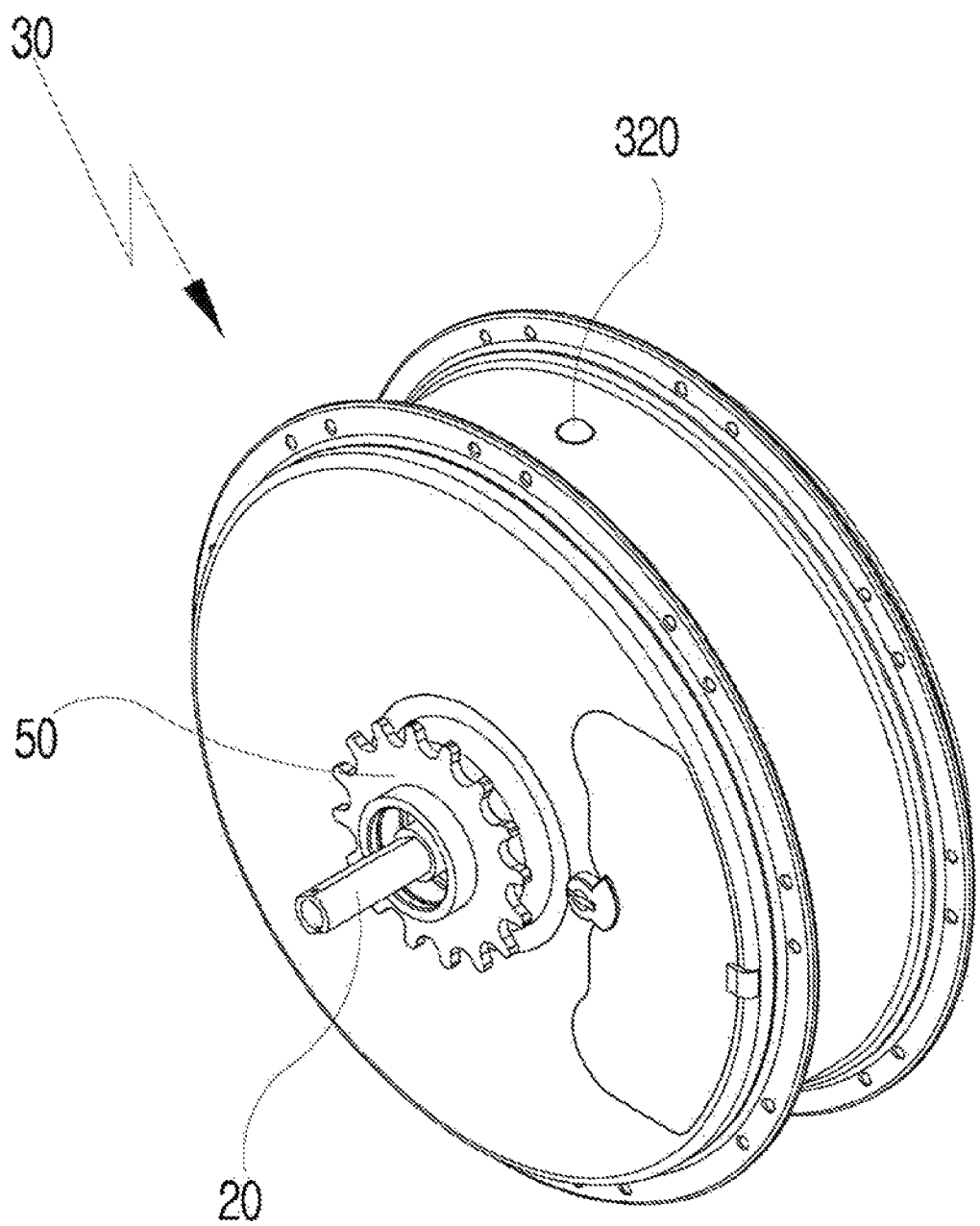
FIG. 2 is a hub according to an embodiment of the present invention.
Figure 3:
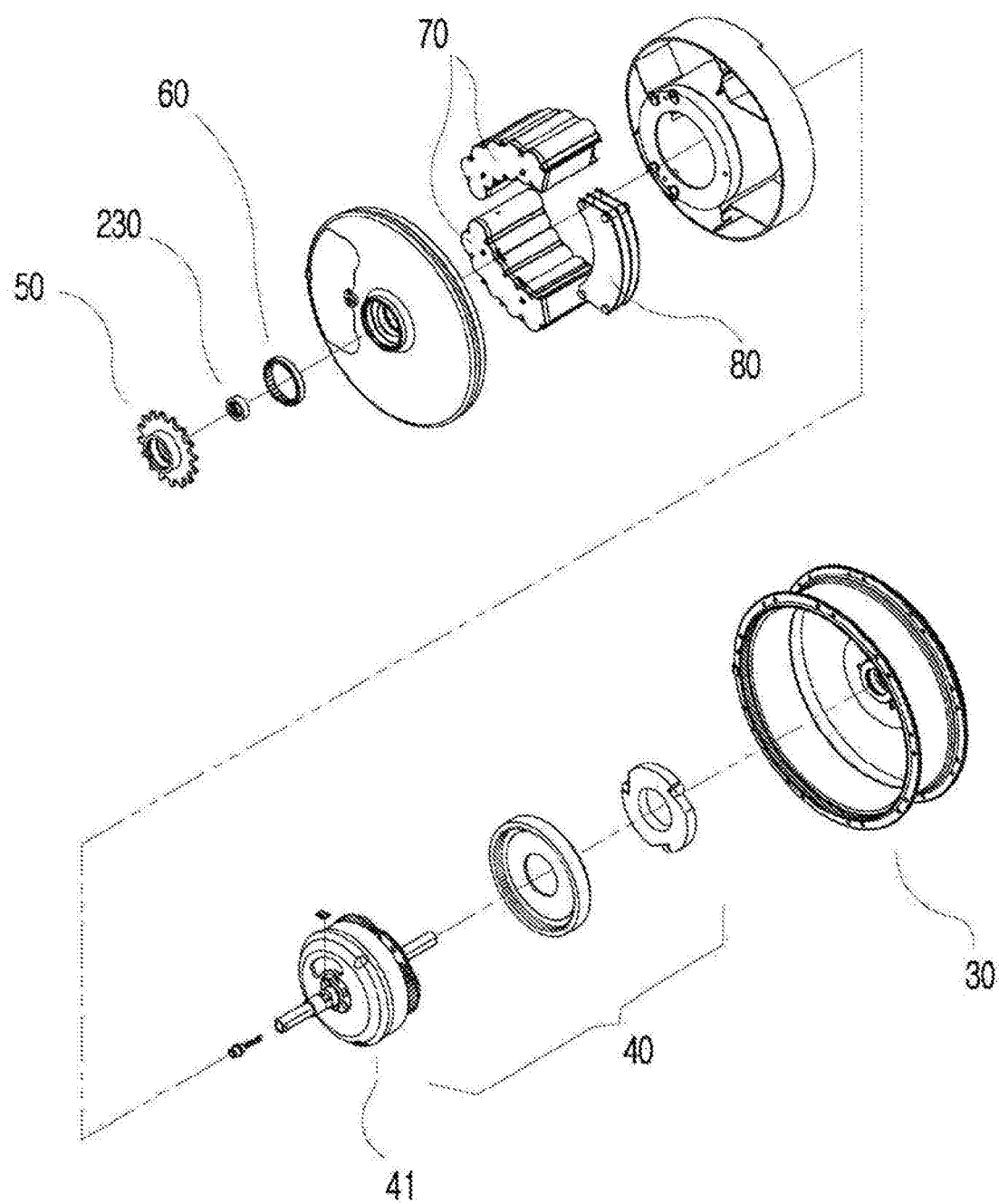
FIG. 3 is an exploded view of a hub according to an embodiment of the present invention.
Figure 4:
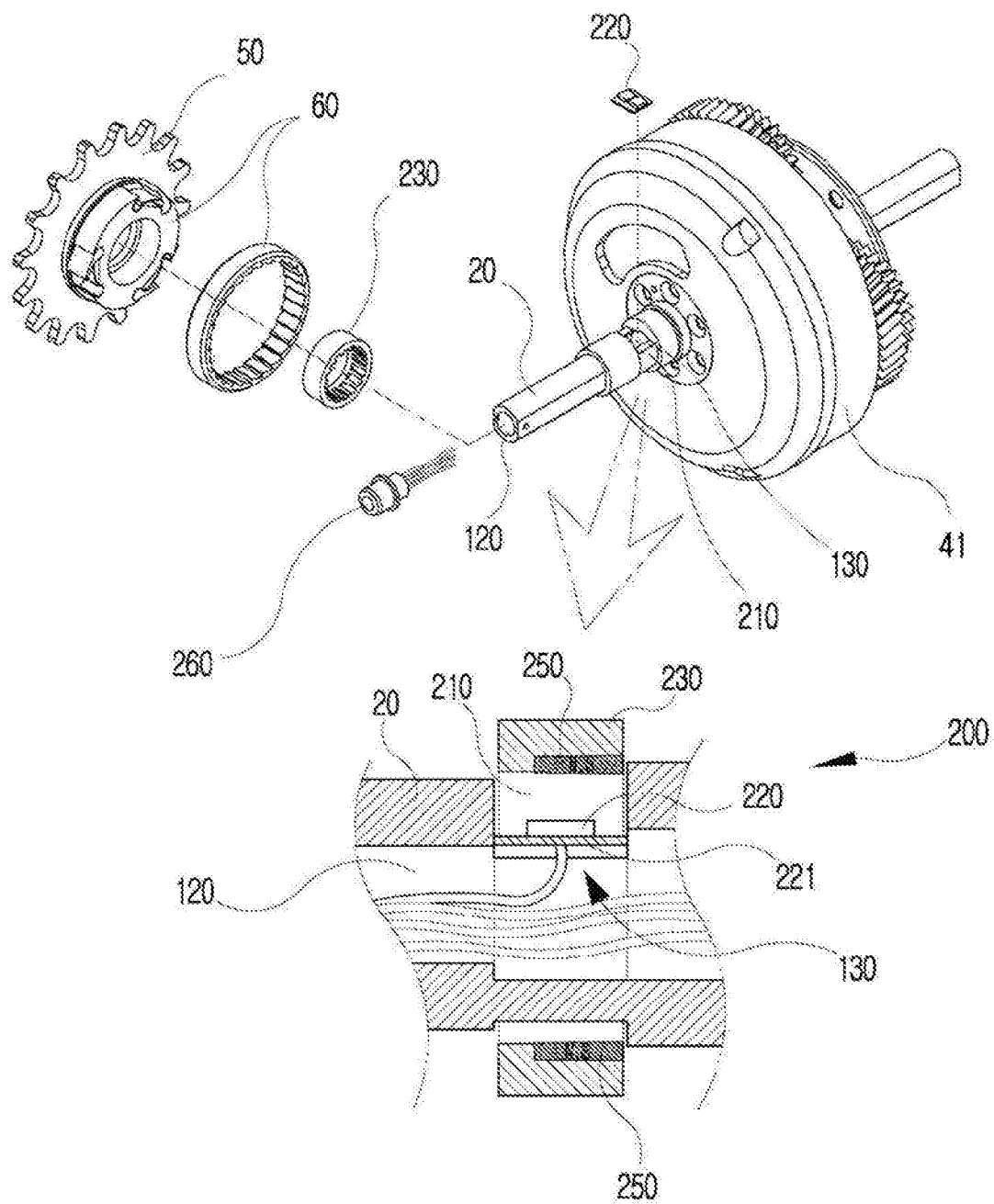
FIG. 4 is a hub according to an embodiment of the present invention and its sectional view equipped with a permanent magnet.
Figure 5:
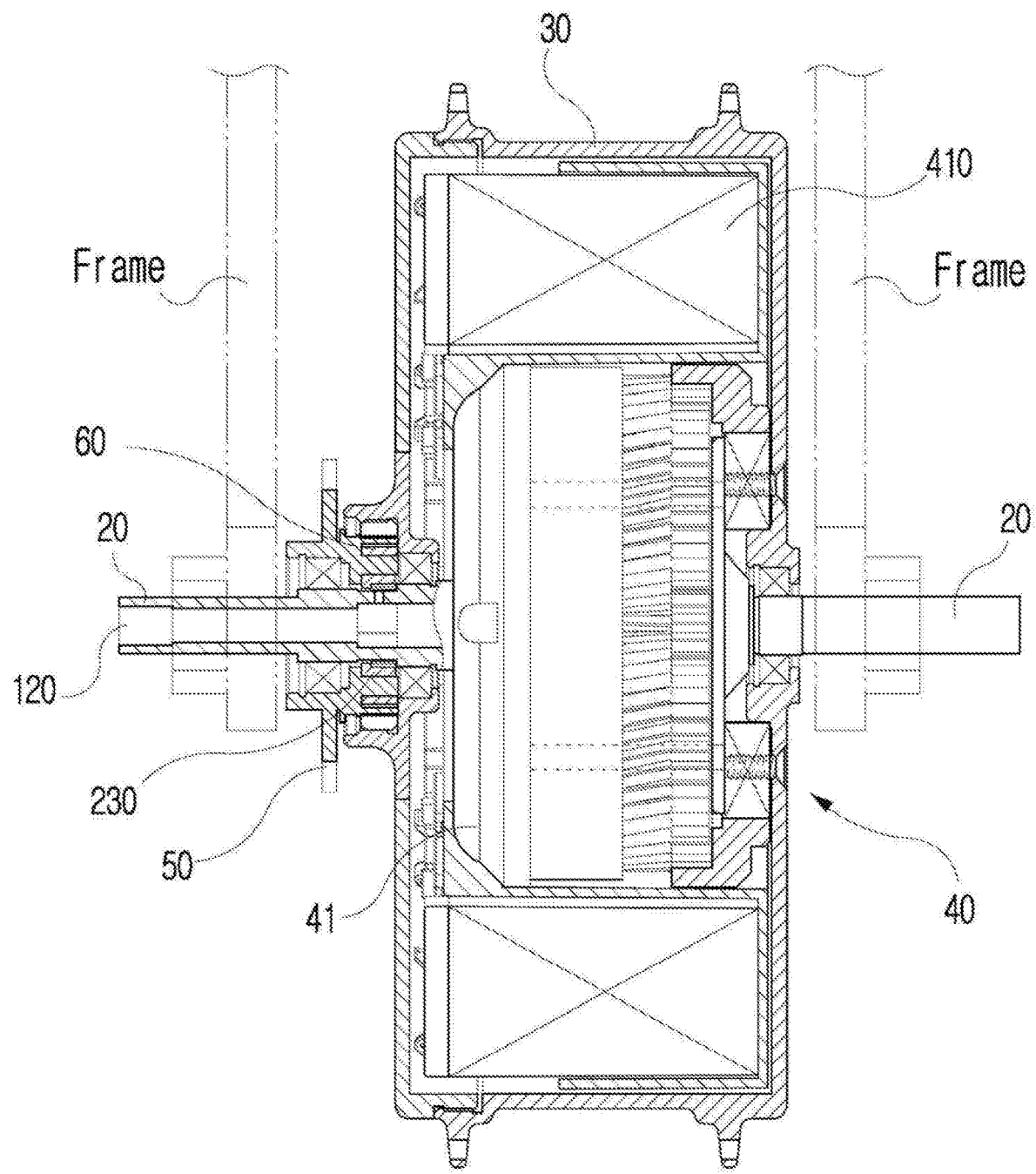
FIG. 5 is a sectional view of a hub according to an embodiment of the present invention.
Figure 6:
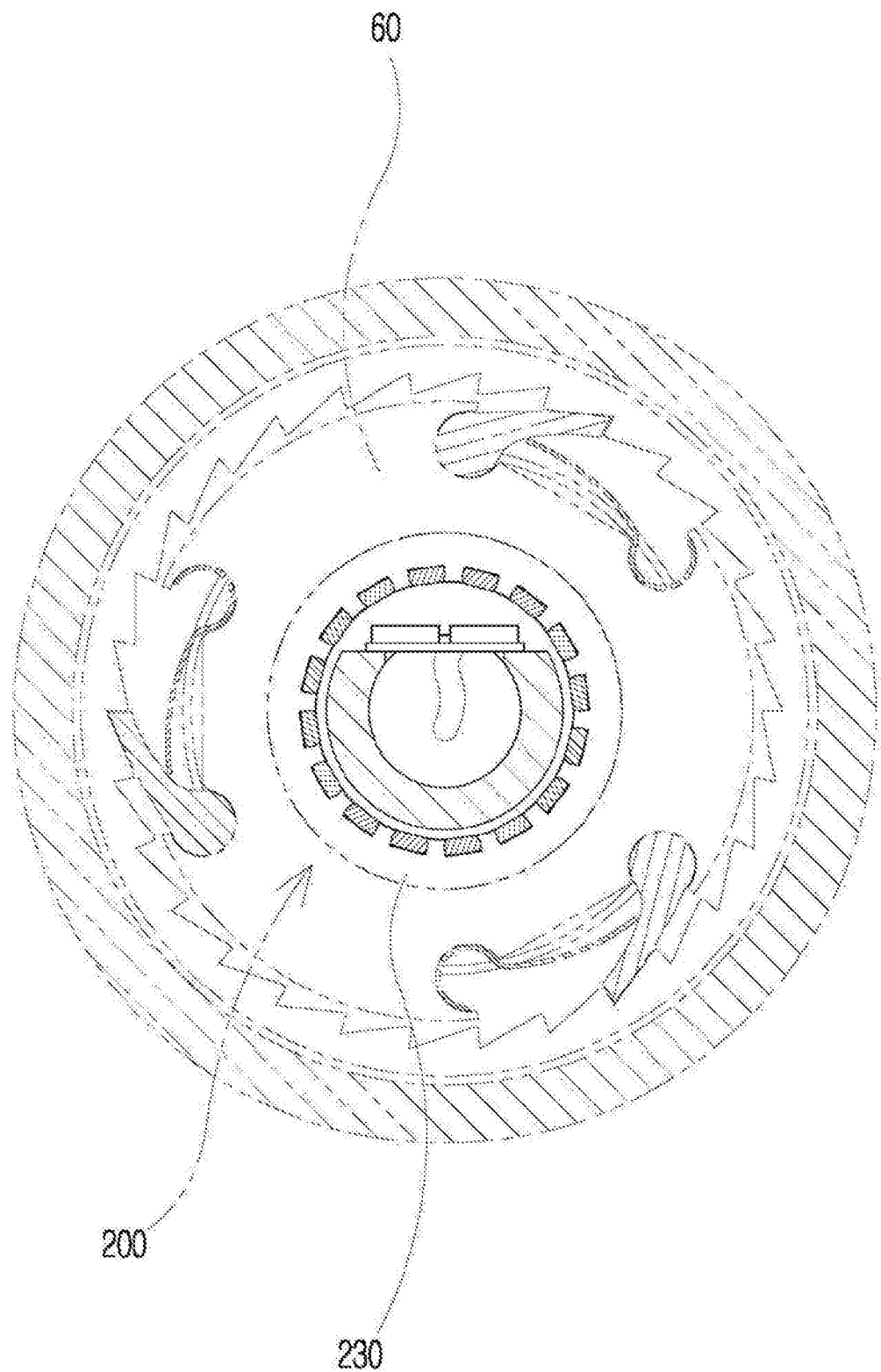
FIG. 6 is a ratchet unit according to an embodiment of the present invention.
Figure 7:
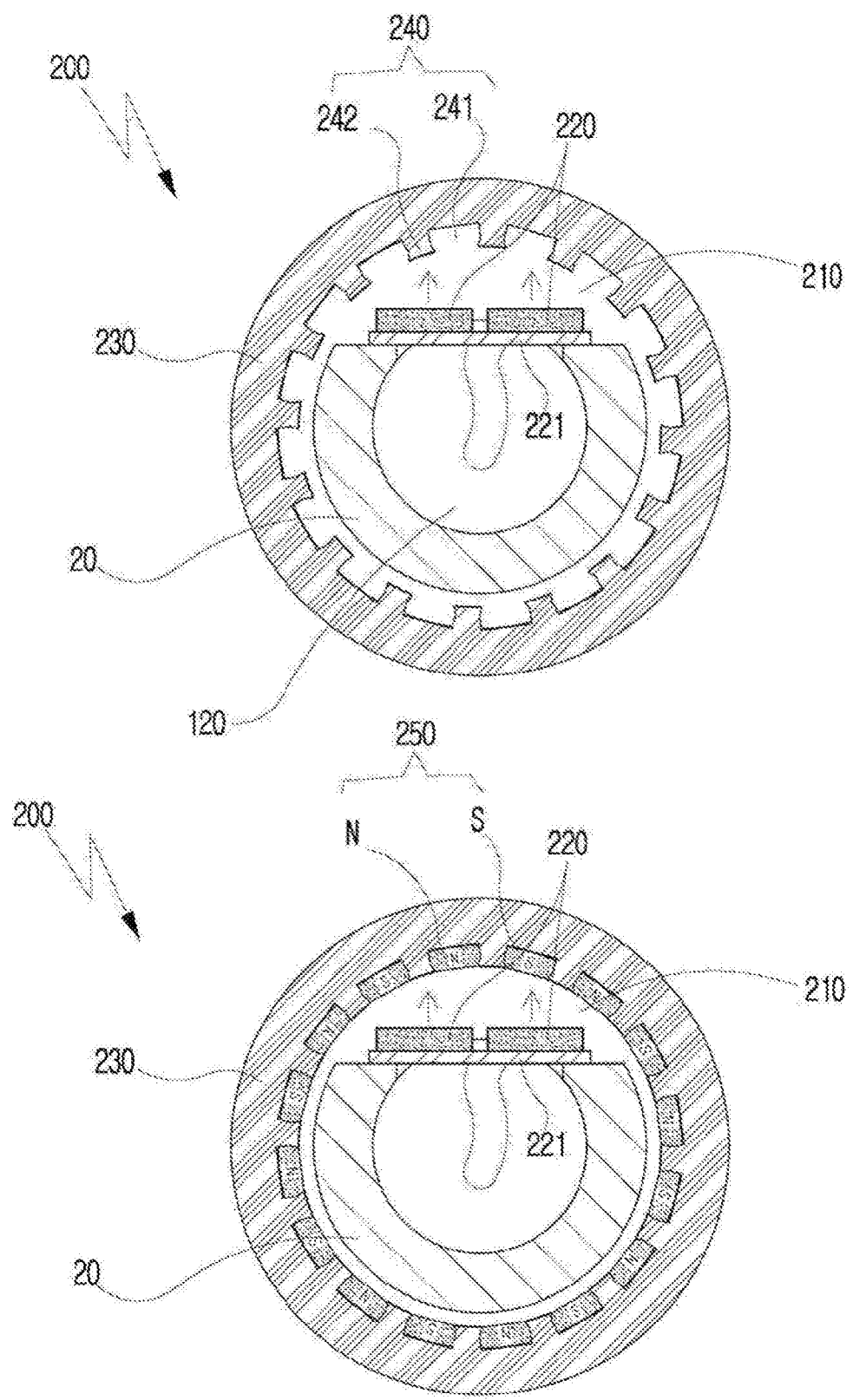
FIG. 7 is a sectional view of a rotation detection unit according to an embodiment of the present invention.
Figure 8:
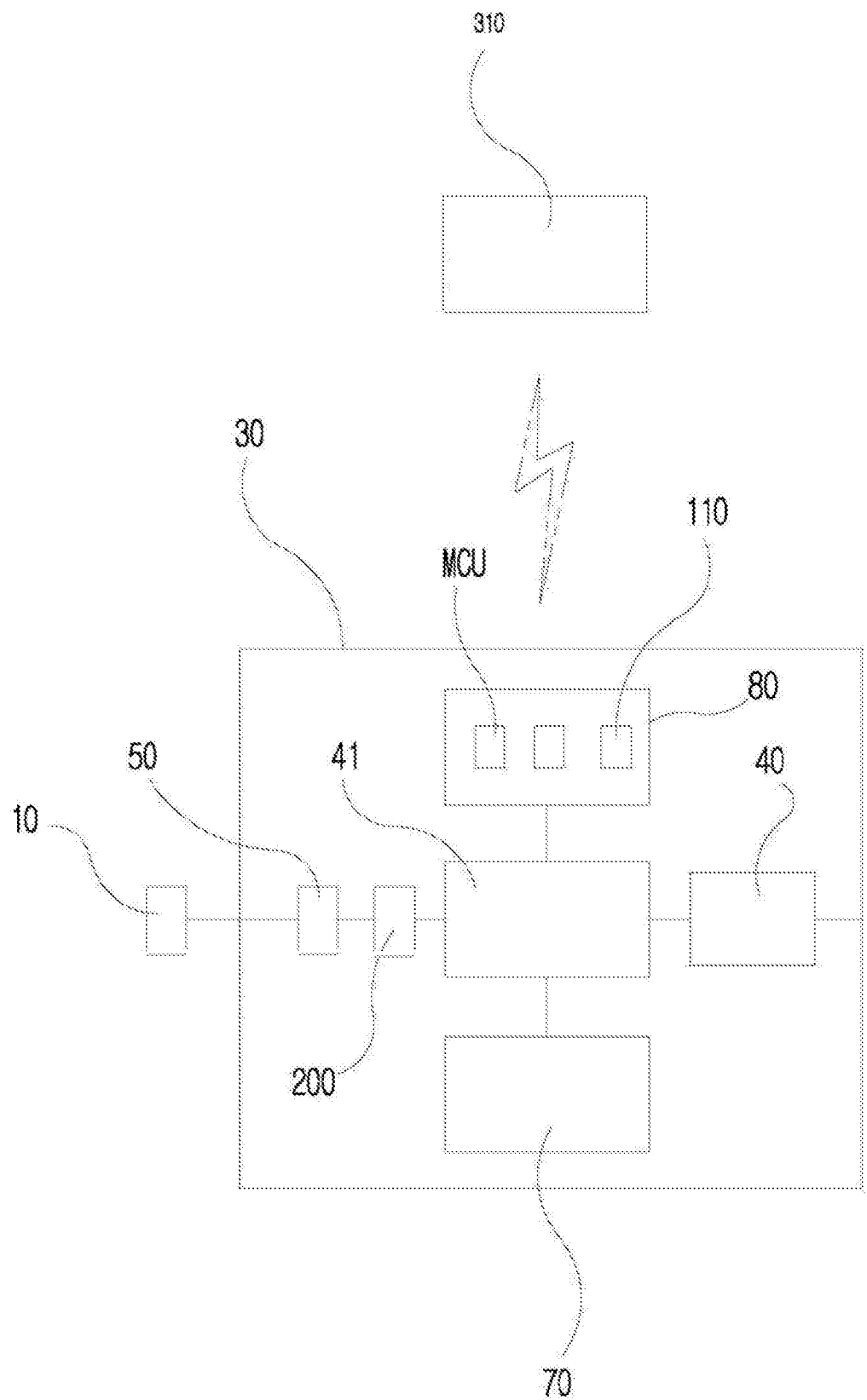
FIG. 8 is a conceptual diagram showing a wireless connection between a key console and a hub according to an embodiment of the present invention.
Figure 9:
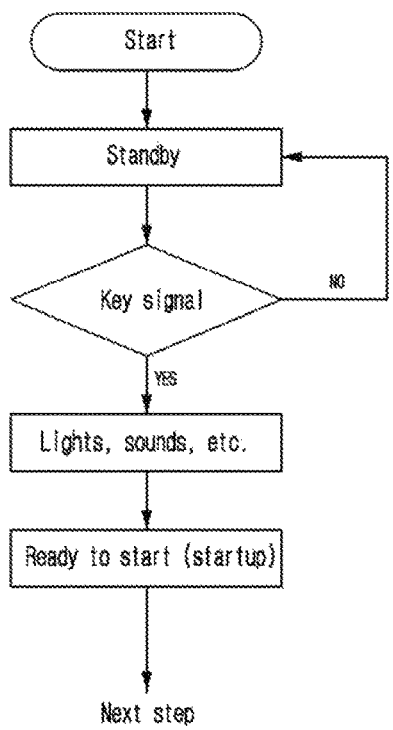
FIG. 9 is a flowchart showing a starting step according to an embodiment of the present invention.
Figure 9:
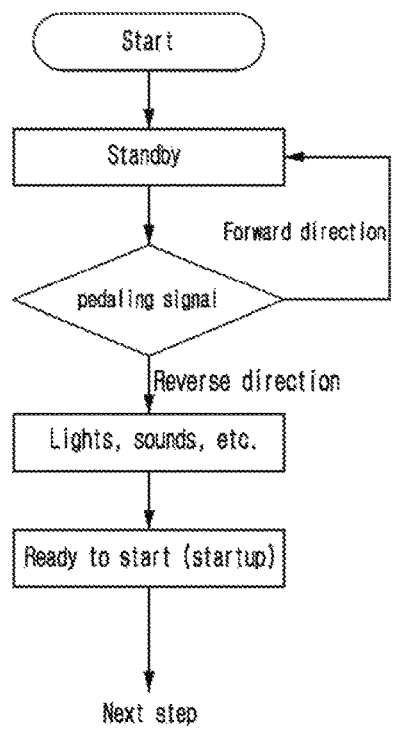
Figure 10:
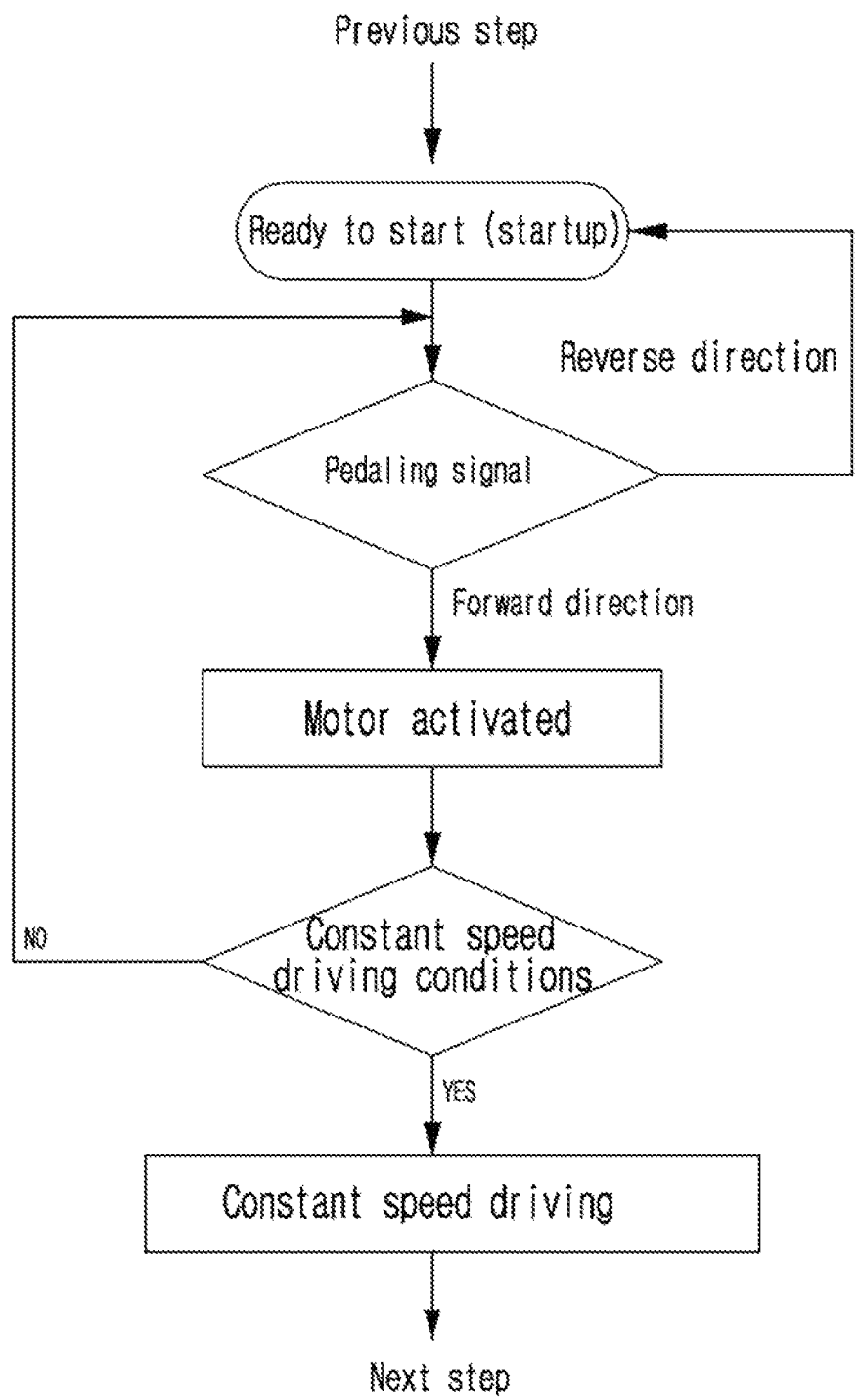
FIG. 10 is a flowchart showing a constant speed driving step according to an embodiment of the present invention.
Figure 11:
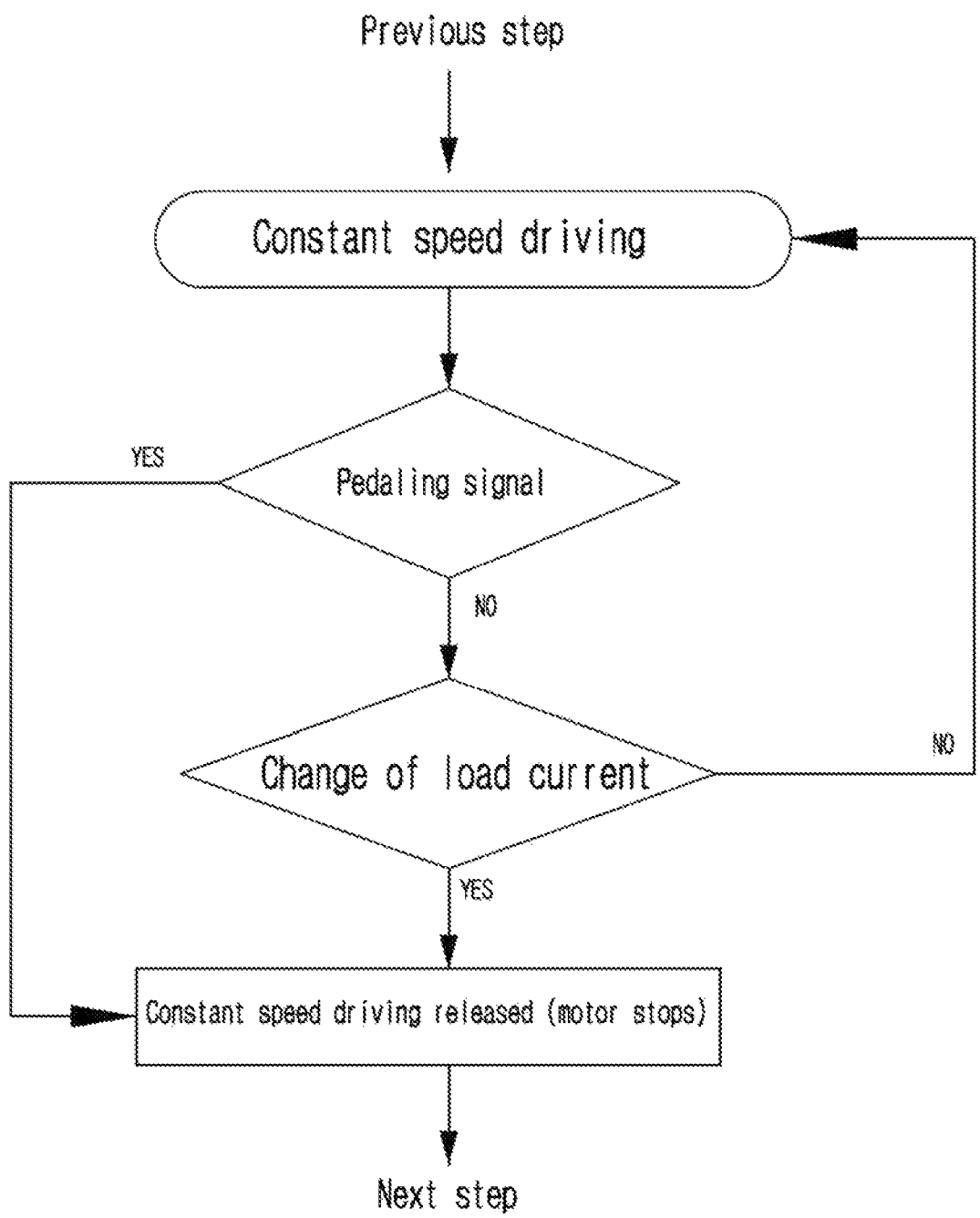
FIG. 11 is a flowchart showing a constant speed driving releasing step according to an embodiment of the present invention.
Figure 12:
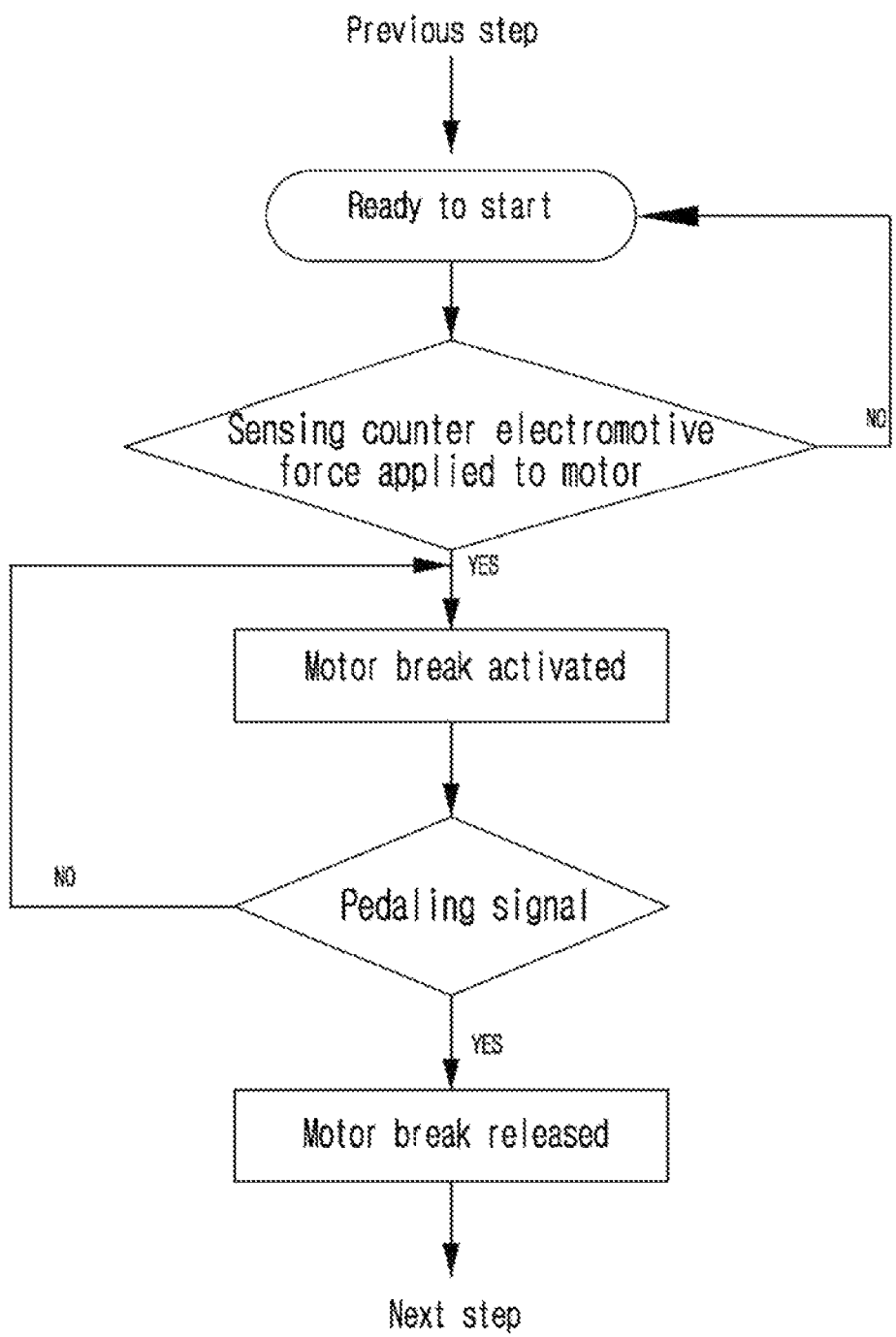
FIG. 12 is a flowchart showing a slope skidding prevention step according to an embodiment of the present invention.

The driving control method of in-wheel drive for an electric bicycle according to the present invention will be described in more details with reference to the drawings.

<In-Wheel Drive Driving Control Driver for Electric Bicycle>

First, an in-wheel drive driving control driver (A) for an electric bicycle according to an embodiment of the present invention will be described.

An electric bicycle according to an embodiment of the present invention may include: a pedal (10) provided between a front wheel (11) and a rear wheel (12) to generate a pedaling power; a rear wheel center support rod (20) fixed to a center of the rear wheel (12) by two frames and spaced apart from the pedal (10); a hub (30) surrounding an outer circumference of the rear wheel center support rod (20) and coupled with spokes of the rear wheel, wherein the hub (30) rotates upon rotation of the rear wheel; an electric driving driver (40) installed inside the hub (30) and including an electric motor (41), wherein the electric motor (41) is driven by an electric battery (70), wherein the electric driving driver (40) transmits an electric power generated by the electric motor (41) to the hub (30) and drives the rear wheel; a sprocket (50) provided on a first side of the hub (30), coupled with the rear wheel center support rod (20), and connected to the pedal by a chain; a ratchet unit (60) provided between the sprocket (50) and the hub (30), transmits the pedaling power to the hub (30) upon a first direction pedaling, and idles upon a second direction pedaling, wherein the first and the second direction pedaling are forward and reverse pedaling, respectively, or vice versa; the electric battery (70) supplying the electric power and driving driving the electric driving driver (40) and the electric motor (41), wherein the electric battery (70) is installed inside or outside the hub (30); and a driving control unit (80) effectively controlling the operation. The driving control unit (80) may include a PCB.

The driving control unit (80) may include: a communication module (110) transmitting operation information through a remote near-field Bluetooth, WiFi, or the like, wherein the communication module (110) freely communicates with an external remote control device e.g., a remote controller, a mobile or tablet device, etc.; a wiring lead-out hole (120) formed in the rear wheel center support rod (20) and transmitting an internal power and an electric signal to outside while the hub (30) rotates, wherein the rear wheel center support rod (20) passes through a center of the hub (30); a rotation detection unit (200) installed between an inner circumference of the ratchet unit (60) and an outer circumference of the rear wheel center support rod (20) and detecting rotational information of the sprocket (50), the ratchet unit (60), or the pedal.

The rotational information may include information on whether the sprocket (50), the ratchet unit (60), or the pedal rotates, a rotational direction, the number of rotation, a rotational speed, whether a rotational movement stops, etc.

The rotation detection unit (200) may include: a groove (210) formed on the rear wheel center support rod (20); and a hall sensor (220) placed in the groove (210). The hall sensor (220) may be one or more. The hall sensor (220) is capable of accurately sensing and recognizing a state of a target in contactless manner. The hall sensor (220) may be a magnetic sensor capable of recognizing N and S poles of a magnet, an optical sensor, a proximity sensor, an ultrasonic sensor, etc.

The rotation detection unit (200) further includes a rotation detecting rotor (230). The rotation detecting rotor (230) is installed on an inner circumference of the sprocket (50) or the ratchet unit (60). A concave (241) and a convex (242) are alternately arranged along an inner circumference of the rotation detecting rotor (230) to form an uneven surface (240). In another embodiment, a first permanent magnet with N magnetic polarity and a second permanent magnet with S magnetic polarity are alternately arranged in a given interval along the inner circumference of the rotation detecting rotor (230).

When the rotation detection unit (200) is configured as described above, information related to pedaling can be collected through the sprocket (50) and the ratchet unit (60), which rotates upon pedaling, and transmitted to the driving control unit (80) in real time. The information related to pedaling includes the rotational direction, the number of rotations, the rotational speed, the rotation status, etc. The information such collected can be variously utilized for many purposes.

Specifically, when a pedaling power is transmitted to the sprocket (50), the sprocket (50) and the ratchet unit (60), which is connected to the sprocket (50), rotate. The rotation detecting rotor (230), which is fixed to the inner circumference of the ratchet unit (60), rotates, too.

As a result, a magnetic field changes by the uneven surface of the inner circumference of the rotation detecting rotor (230) or by the first permanent magnet with N magnetic polarity and the second permanent magnet with S. As mentioned above, the uneven surface is formed by the concave and the convex alternately arranged along an inner circumference of the rotation detecting rotor (230). Such change is detected by the hall sensor (220) and transmitted to the driving control unit (80) in real time. In this way, the pedaling information, i.e., the information related to the user's pedaling power, is transmitted to the driving control unit (80) in real time. The hall sensor (220) may be a magnetic sensor capable of recognizing N and S poles of a magnet, an optical sensor, a proximity sensor, an ultrasonic sensor, etc.

A wiring hole (130) may further be formed in the groove (210) of the rear wheel center support rod (20). The wiring lead-out hole (120) is formed in the rear center support rod (20). The hall sensor (220) is placed in the groove (210). Wiring of the hall sensor (220) can be led out through the wiring hole (130) and the wiring lead-out hole (120) to the driving control unit (80).

More preferably, a charging terminal for charging the electric battery (70) and an external input terminal (260) are provided at one or both ends of the rear wheel center support rod (20). The charging terminal for charging the electric battery (70) is housed in the hub (30). The charging terminal for the electric battery (70) may be connected to an external power source for charging the electric battery (70). The external input terminal (260) diagnoses a state of the electric driving driver (40) and the electric motor (41) and, if necessary, inspects, corrects, and updates a program loaded on the driving control unit.

In addition, a separate key console (310) may be further provided which is connected to the driving control unit (80) through wireless communication. A unique identification number is programed to the key console (310) so that the electric bicycle equipped with the communication module can recognize when the key console (310) approaches around.

It is more effective to provide a transparent window at one of front and rear surfaces of the hub (30) or at an outer circumference of the hub (30). A light emitting unit (320) may inform the outside by light when the bicycle is ready to start, i.e., in a state ready for driving by an electric power. The light emitting unit (320) may include a light emitting element (LED).

The in-wheel drive driving control driver (A) for electric bicycle according to an embodiment may be structured as described above. However, it may be modified by employing conventional features, if necessary.

Hereinafter, for convenience of explanation, the above mentioned control device is hereinafter referred to as an in-wheel drive driving control driver (A) for an electric bicycle.

<Driving Control Method>

Described below is a method of controlling the in-wheel drive driving control driver (A) for an electric bicycle according to an embodiment of the present invention.

A driving control method for an electric bicycle, which is equipped with an in-wheel drive driving control driver (A) and a pedal assist system (PAS), includes: a starting step of supplying an electric power to an electric motor (41) of an electric driving unit (40) and an driving control unit (80) and making the electric bicycle ready to drive using the electric power upon a start signal; a constant speed driving step of traveling at a constant rotational speed under the control of the electric driving unit (40), regardless of a pedaling force; a constant speed driving releasing step of releasing the constant speed driving step when necessary; and a slope skidding prevention step of preventing the electric bicycle from being pushed in a moving direction or in an opposite direction to the moving direction when the electric bicycle starts and stops on a slope by applying a high load and a counter electromotive force to the electric driving unit (40) and the electric motor (41).

At the starting step, power is supplied to parts such as the driving control unit which are necessary for automatic driving by electric power and control thereof to make the bicycle ready to travel by electric power.

The starting step may be initiated by using a key console. A unique number is assigned to the key console. When a user having the key console approaches the electric bicycle, the communication module mounted on the driving control unit (80) of the electric bicycle recognizes the key console and then makes the electric bicycle ready to start.

The starting step may be initiated by pedaling operation. When the pedal is operated by a user in a predetermined pattern, the driving control unit (80) recognizes it by the rotation detection unit (200) and makes the electric bicycle ready to start. The rotation detection unit (200) is installed between the inner circumference of the ratchet unit (60) and the center support rod (20) of the rear wheel of the electric bicycle.

Among them, starting by the key console is advantageous in terms of security since the unique identification number is set in the console held by the user so that the startup is capable only by the user having the console.

On the other hand, starting by the pedal is advantageous in that no additional device or tool such as a console is necessary to start the bicycle since the user can start the bicycle by pedaling manipulation.

For example, a pedaling pattern initiating the starting step may be set to the condition "one or more reverse pedaling." The pedaling pattern or the condition can be stored in the driving control unit (80). Under this condition, a user can initiate the starting step simply by manipulating a pedal in a reverse direction. This is pretty convenient.

At the constant speed driving step, the bicycle travels at a constant speed under an automatic driving control by the electric driving unit (40).

Alternatively, the constant speed driving step can be controlled by pedaling pattern manipulation. The pedaling pattern can be set in various ways. In an embodiment, it can be a combination of forward and reverse pedaling. For example, the pedaling pattern can be set to "at a driving speed of 10 km/h or more and a half or more round of reverse pedaling within 3 seconds." Such pedaling pattern is pretty simple to manipulate and thus easy to reduce an manipulation error.

For example, the combination of forward and reverse pedaling described above may be a combination of a signal or information whether a pedal rotates, the number of rotation, and the direction of rotation. The signal or information is collected and transmitted by the rotation detection unit (200) provided on the rear wheel center support bar (20). The combination of forward and reverse pedaling can be programed in the driving control unit (80).

The constant speed driving releasing step is carried when it is necessary to stop the constant speed driving by the electric driving unit (40). Such situation includes when the travel ends, when a sudden stop is required, or when a user chooses to operate the bicycle solely by a pedaling power without an assistance of an electric power.

The constant speed driving releasing step is made by a pedal manipulation or by a mechanical brake manipulation.

In the pedal manipulation, a release condition may be set to when a forward or reverse pedaling is applied. The pedaling motion can be detected by the rotation detection unit (200) which is installed in the rotation detection unit (200). For example, when one or more pulse signal, which indicates the forward or reverse pedaling, is sensed by the rotation detection unit (200), the electric motor (41) stops and an electric power is shut off.

In the mechanical brake manipulation, release timing may be set considering a change of load current per unit time applied to the electric motor (41) and a moving speed at the time when a user intentionally stops the wheel of the bicycle using a mechanical brake. At the release timing, the electric motor stops and the electric power is cut off.

The release timing may be set to when a user s intention to stop the bicycle is apparent. For example, when a given level of load current per unit time is applied to the electric motor (41) continuously for a given time period, it can be assumed that a user tries to stop the bicycle intentionally.

When a bicycle starts or stops on a slope, a large load and especially a counter electromotive force (reverse rotation of the wheel) are applied to the electric driving unit (40) and the electric motor (41). The slope skidding prevention step prevents the bicycle from being pushed in a moving direction or in an opposite direction to the moving direction when the electric bicycle starts and stops on a slope and promotes a safe and easy driving on a slope.

When a bicycle travels on a slope, the reverse electromotive force may be applied to the electric motor (41) for a short time, causing a wheel of the bicycle to rotate in an opposite direction to its traveling direction. The reverse electromotive force is sensed by the driving control unit connected to the electric motor (41). Then, an electric brake system of the electric motor (4) works. The electric brake system may be released when the reverse electromotive force disappears and a sensor signal indicating a movement of the pedal (10) is sensed. Then a normal traveling is resumed.

What is claimed is:

1. A driving control method for an electric bicycle,
wherein the electric bicycle has an in-wheel drive driving control driver (A) and employs a pedal assist system (PAS),
wherein the in-wheel drive driving control driver (A) comprises:
    a pedal (10) provided between a front wheel (11) and a rear wheel (12) and generating a pedaling power;
    a rear wheel center support rod (20) fixed to a center of the rear wheel (12) by two frames and spaced apart from the pedal (10);
    a hub (30) surrounding an outer circumference of the rear wheel center support rod (20) and coupled with sties of the rear wheel wherein the hub rotates upon rotation of the rear wheel;
    an electric driving driver (40) installed inside the hub (30) and including an electric motor (41), wherein the electric motor (41) is driven by an electric battery (70), wherein the electric driving driver (40) transmits an electric power generated by the electric motor (41) to the hub (30) and drives the rear wheel;
    a sprocket (50) provided on a first side of the hub (30) coupled with the rear wheel center support rod (20), and connected to the pedal by a chain;
    a ratchet unit (60) provided between the sprocket (50) and the hub (30), transmits the pedaling power to the hub (30) upon a first direction pedaling, and idles upon a second direction pedaling;
    the electric battery (70) supplying the electric power and driving the electric driving driver (40) and the electric motor (41), wherein the electric battery (70) is installed inside or outside the hub (30); and
    a driving control unit (80),
wherein the driving control unit (80) comprises:
    a communication module (110) communicating with an external remote control device;
    a wiring lead-out hole (120) formed inside the rear wheel center support rod (20) and transmitting an internal power and an electric signal to outside while the hub (30) rotates, wherein the rear wheel center support rod (20) passes through a center of the hub (30); and
    a rotation detection unit (200) installed between an inner circumference of the ratchet unit (60) and an outer circumference of the rear wheel center support rod (20) and detecting rotational information of the sprocket (50), the ratchet unit (60), or the pedal,
wherein the driving control method comprises:
    a starting step of supplying the electric power to the electric motor (41) of the electric driving unit (40) and the driving control unit (80) and making the electric bicycle ready to move using the electric power upon a start signal;
    a constant speed driving step of moving the electric bicycle at a constant rotational speed under the control of the electric driving unit (40), regardless of the pedaling power is provided;
    a constant speed driving releasing step of automatically discontinuing, the constant speed driving step; and
    a slope skidding prevention step of preventing the electric bicycle, from being pushed in a moving direction or in an opposite direction to the moving direction when, the electric bicycle starts and stops on a slope by applying a high load and a counter electromotive force to the electric driving unit (40) and the electric motor (41),
wherein the starting step is initiated by
    using a key console communicating with a communication module, wherein the communication module is mounted on a drive control unit (80) of the electric bicycle,
wherein a unique identification number is assigned to the key console so that the communication module is responsive to the key console present within a predetermined distance.

2. The driving control method of claim 1,
wherein the constant speed driving step is initiated when a driving speed is 10 km/h or more and a half or more round of reverse pedaling is provided within 3 seconds.

3. The driving control method of claim 1,
wherein the constant speed driving releasing step is initiated
    by a forward or reverse pedaling.

4. The driving control method of claim 1, wherein the slope skidding prevention step comprises:
sensing a counter electromotive force applied to the electric motor (41) for a given time period;
applying an electric brake of the electric motor (41); and
releasing the electric brake when a pedal movement signal is detected.

5. The driving control method of claim 1,
wherein the constant speed driving releasing step is initiated by mechanical break manipulation,
wherein, in the mechanical brake manipulation, a release timing is determined considering a change of load current per unit time applied to the electric motor (41) and a moving speed of the electric bicycle.

6. A driving control method for an electric bicycle,
wherein the electric bicycle has an in-wheel drive driving control driver (A) and employs a pedal assist system (PAS),
wherein the in-wheel drive driving control driver (A) comprises:

a pedal (10) provided between a front wheel (11) and a rear wheel (12) and generating a pedaling power;

a rear wheel center support rod (20) fixed to a center of the rear wheel (12) by two frames and spaced apart from the pedal (10);

a hub (30) surrounding an outer circumference of the rear wheel center support rod (20) and coupled with spokes of the rear wheel, wherein the hub rotates upon rotation of the rear wheel, an electric driving driver (40) installed inside the hub (30) and including an electric motor (41), wherein the electric motor (41) is driven by an electric battery (70), wherein the electric driving driver (40) transmits an electric power generated by the electric motor (41) to the hub (30) and drives the rear wheel;

a sprocket (50) provided on a first side of the hub (30), coupled, with the rear wheel center support rod (20), and connected to the pedal by a chain;

a ratchet unit (60) provided between the sprocket (50) and the hub (30), transmits the pedaling power to the hub (30) upon a first direction pedaling, and idles upon a second direction pedaling;

the electric battery (70) supplying the electric power and driving the electric driving driver (40) and the electric motor (41), wherein the electric battery (70) is installed inside or outside the hub (30); and a driving, control unit (80), wherein the driving control unit (80) comprises:

a communication module (110) communicating with an external remote control device;

a wiring lead-out hole (120) formed inside the rear wheel center support rod (20) and transmitting an internal power and an electric signal to outside while the hub (30) rotates, wherein the rear wheel center support rod (20) passes through a center of the hub (30); and a rotation detection unit (200) installed between an inner circumference of the ratchet unit (60) and an outer circumference of the rear wheel center support rod (20) and detecting rotational information of the sprocket (50), the ratchet unit (60), or the pedal, wherein the driving control method comprises:

a starting step of supplying the electric power to the electric motor (41) of the electric driving unit (40) and the driving control unit (80) and making the electric bicycle ready to move using the electric power upon a start signal;

a constant speed driving step of moving the electric bicycle at a constant rotational speed under the control of the electric driving unit (40), regardless of the pedaling power is provided;

a constant speed driving releasing step of automatically discontinuing the constant speed driving step; and a slope skidding prevention step of preventing the electric bicycle from being pushed in a moving direction or in an opposite direction to the moving direction when the electric bicycle starts and stops on a slope by applying a high load and a counter electromotive force to the electric driving unit (40) and the electric motor (41), wherein the starting step is initiated by using a key console communicating with a communication module, wherein the communication module is mounted on a drive control unit (80) of the electric bicycle, wherein a unique identification number is assigned to the key console so that the communication module is responsive to the key console present within a predetermined distance.

7. The driving control method of claim 6,
wherein the constant speed driving step is initiated when a driving speed is 10 km/h or more and a half or more round of reverse pedaling is provided within 3 seconds.

8. The driving control method of claim 6,
wherein the constant speed driving releasing step is initiated by a forward or reverse pedaling.

9. The driving control method of claim 6, wherein the slope skidding prevention step comprises:

sensing a counter electromotive force applied to the electric motor (41) for a given time period;

applying an electric brake of the electric motor (41); and releasing the electric brake when a pedal movement signal is detected.

10. The driving control method of claim 6,
wherein the constant speed driving releasing step is initiated by mechanical break manipulation,
wherein, in the mechanical brake manipulation, a release timing is determined considering a change of load current per unit time applied to the electric motor (41) and a moving speed of the electric bicycle.

\* \* \* \* \*